United States Patent
Walsh et al.

(10) Patent No.: US 12,304,677 B2
(45) Date of Patent: May 20, 2025

(54) RECONFIGURABLE TRAY ENGAGING ASSEMBLY

(71) Applicant: Graphic Packaging International, LLC, Atlanta, GA (US)

(72) Inventors: Joseph C. Walsh, Boulder, CO (US); Scott Thomas Strand, Lindstrom, MN (US); Mark Woodward, Lakewood, CO (US)

(73) Assignee: Graphic Packaging International, LLC, Atlanta, GA (US)

( * ) Notice: Subject to any disclaimer, the term of this patent is extended or adjusted under 35 U.S.C. 154(b) by 199 days.

(21) Appl. No.: 18/084,677

(22) Filed: Dec. 20, 2022

(65) Prior Publication Data

US 2023/0192338 A1 Jun. 22, 2023

Related U.S. Application Data

(60) Provisional application No. 63/292,014, filed on Dec. 21, 2021.

(51) Int. Cl.
*B65B 43/46* (2006.01)

(52) U.S. Cl.
CPC .................. *B65B 43/46* (2013.01)

(58) Field of Classification Search
CPC .................................................. B65B 43/46
See application file for complete search history.

(56) References Cited

U.S. PATENT DOCUMENTS

| | | |
|---|---|---|
| 1,405,139 A | 1/1922 | La Bombard et al. |
| 3,187,483 A | 6/1965 | Steele et al. |
| 3,575,409 A | 4/1971 | Calvert |
| 3,872,652 A | 3/1975 | LaBantschnig et al. |
| 3,951,049 A | 4/1976 | Brackmann |
| 3,981,494 A | 9/1976 | Prestegaard |
| 4,034,658 A | 7/1977 | Sherman |
| 4,244,281 A | 1/1981 | Kauffman et al. |
| 4,256,526 A | 3/1981 | McDaniel |
| 4,331,434 A | 5/1982 | Buschor |
| 4,479,345 A | 10/1984 | Nord |
| 4,574,561 A | 3/1986 | Dirico |

(Continued)

FOREIGN PATENT DOCUMENTS

| | | |
|---|---|---|
| CN | 2317075 Y | 5/1999 |
| CN | 106516216 A | 3/2017 |

(Continued)

OTHER PUBLICATIONS

International Search Report and Written Opinion for PCT/US2022/053457 dated Apr. 21, 2023.

*Primary Examiner* — Gene O Crawford
*Assistant Examiner* — Lester Rushin, III
(74) *Attorney, Agent, or Firm* — Womble Bond Dickinson (US) LLP

(57) ABSTRACT

A tray engaging assembly including a first vertical support, a second vertical support, a first guide rail coupled to the first vertical support, a second guide rail coupled to the second vertical support and spaced apart from the first guide rail and such that a pocket is defined between the first guide rail and the second guide rail for at least partially receiving at least one tray, and a plurality of tray engaging members pivotably coupled to a respective guide rail for engaging at least one tray.

27 Claims, 5 Drawing Sheets

(56) References Cited

U.S. PATENT DOCUMENTS

| | | |
|---|---|---|
| 4,582,315 A | 4/1986 | Scarpa et al. |
| 4,590,745 A | 5/1986 | Randles |
| 4,802,664 A | 2/1989 | Larsen |
| 4,815,252 A | 3/1989 | Renard et al. |
| 4,838,846 A | 6/1989 | Focke et al. |
| 4,881,934 A | 11/1989 | Harston et al. |
| 4,986,522 A | 1/1991 | Paulson |
| 5,019,029 A | 5/1991 | Calvert |
| 5,102,385 A | 4/1992 | Calvert |
| 5,102,485 A | 4/1992 | Keeler et al. |
| 5,176,612 A | 1/1993 | Calvert et al. |
| 5,188,695 A | 2/1993 | Colton |
| 5,254,071 A | 10/1993 | Laroche |
| 5,282,528 A | 2/1994 | Hudson |
| 5,501,065 A | 3/1996 | Fischer et al. |
| 5,537,806 A | 7/1996 | Grierson et al. |
| 5,542,349 A | 8/1996 | Goesslinghoff |
| 5,595,043 A | 1/1997 | Radigan |
| 5,632,368 A | 5/1997 | Moncrief |
| 5,653,671 A | 8/1997 | Reuteler |
| 5,657,610 A | 8/1997 | Dietrich et al. |
| 5,662,577 A | 9/1997 | Reuteler |
| 5,980,440 A | 11/1999 | Mitman et al. |
| 5,988,858 A * | 11/1999 | Yuyama ............... G07F 7/025 700/229 |
| 5,997,458 A | 12/1999 | Guttinger et al. |
| 6,038,837 A | 3/2000 | Odenthal |
| 6,050,063 A | 4/2000 | Ford et al. |
| 6,073,423 A | 6/2000 | House |
| 6,146,028 A | 11/2000 | Preszler |
| 6,213,286 B1 | 4/2001 | Hunter et al. |
| 6,226,965 B1 | 5/2001 | Lam |
| 6,267,717 B1 | 7/2001 | Sass et al. |
| 6,311,457 B1 | 11/2001 | May et al. |
| 6,490,843 B1 | 12/2002 | May |
| 6,497,084 B1 | 12/2002 | Janen |
| 6,509,052 B1 | 1/2003 | Benham et al. |
| 6,550,608 B1 | 4/2003 | Brown et al. |
| 6,689,034 B2 | 2/2004 | Walsh et al. |
| 6,993,889 B2 | 2/2006 | Ford et al. |
| 7,070,551 B2 | 7/2006 | Lasson |
| 7,210,612 B2 | 5/2007 | Walsh et al. |
| 7,461,838 B2 | 12/2008 | Hendricks et al. |
| 7,530,381 B2 | 5/2009 | Walsh et al. |
| 7,658,318 B2 | 2/2010 | Walsh et al. |
| 7,695,421 B2 | 4/2010 | Ford |
| 7,717,322 B2 | 5/2010 | Walsh et al. |
| 8,226,794 B2 | 7/2012 | Fogle |
| 8,870,519 B2 | 10/2014 | Karst |
| 10,562,675 B2 | 2/2020 | Walsh |
| 11,325,336 B2 | 5/2022 | Walsh |
| 11,518,133 B2 | 12/2022 | Walsh |
| 11,628,967 B2 | 4/2023 | Walsh et al. |
| 2002/0041067 A1 | 4/2002 | Muller |
| 2006/0037290 A1 | 2/2006 | Smith |
| 2006/0197272 A1 | 9/2006 | Hendricks et al. |
| 2007/0042072 A1 | 2/2007 | Johns et al. |
| 2007/0063416 A1 | 3/2007 | Kisch |
| 2007/0085260 A1 | 4/2007 | Hendricks et al. |
| 2007/0257416 A1 | 11/2007 | Ford |
| 2008/0227612 A1 | 9/2008 | Harston |
| 2009/0087296 A1 | 4/2009 | May et al. |
| 2012/0144785 A1 | 6/2012 | Vaccari |
| 2014/0037402 A1* | 2/2014 | Ickert ..................... B65B 7/16 414/226.02 |
| 2020/0087078 A1 | 3/2020 | Ziegler |
| 2020/0369420 A1 | 11/2020 | Bonnain et al. |
| 2023/0118516 A1* | 4/2023 | Lundgren ............ B65G 21/06 198/804 |
| 2024/0051696 A1* | 2/2024 | Höynck ................ B65B 43/30 |
| 2024/0417122 A1* | 12/2024 | Liu ....................... B65B 43/46 |

FOREIGN PATENT DOCUMENTS

| | | |
|---|---|---|
| DE | 379 470 C | 8/1923 |
| DE | 10 2007 057114 A1 | 5/2008 |
| DE | 10 2016 203204 A1 | 9/2016 |
| EP | 0 680 880 A1 | 11/1995 |
| GB | 1 355 270 A | 6/1974 |
| JP | 08-000680 U | 4/1996 |
| KR | 10-2014-0002921 A | 1/2014 |
| KR | 10-1787026 B1 | 10/2017 |

* cited by examiner

RECONFIGURABLE TRAY ENGAGING ASSEMBLY

CROSS-REFERENCE TO RELATED APPLICATION

This application claims the benefit of U.S. Provisional Patent Application No. 63/292,014, filed on Dec. 21, 2021.

INCORPORATION BY REFERENCE

The disclosures of each of U.S. Provisional Patent Application No. 63/110,578, filed on Nov. 6, 2020, U.S. Provisional Patent Application No. 63/110,582, filed on Nov. 6, 2020, U.S. Provisional Patent Application No. 63/110,587, filed on Nov. 6, 2020, U.S. Provisional Patent Application No. 63/126,157, filed on Dec. 16, 2020, U.S. Provisional Patent Application No. 63/128,418, filed on Dec. 21, 2020, U.S. Provisional Patent Application No. 63/139,341, filed on Jan. 20, 2021, U.S. Provisional Patent Application No. 63/169,302, filed on Apr. 1, 2021, U.S. Provisional Patent Application No. 63/169,418, filed on Apr. 1, 2021, U.S. Provisional Patent Application No. 63/174,724, filed on Apr. 14, 2021, U.S. Provisional Patent Application No. 63/178,116, filed on Apr. 22, 2021, U.S. Provisional Patent Application No. 63/191,412, filed on May 21, 2021, U.S. patent application Ser. No. 17/519,080, filed on Nov. 4, 2021, U.S. patent application Ser. No. 17/519,084, filed on Nov. 4, 2021, U.S. patent application Ser. No. 17/519,092, filed on Nov. 4, 2021, U.S. patent application Ser. No. 17/519,097, filed on Nov. 4, 2021, U.S. patent application Ser. No. 17/519,107, filed on Nov. 4, 2021, and U.S. Provisional Patent Application No. 63/292,014, filed on Dec. 21, 2021, are hereby incorporated by reference for all purposes as if presented herein in their entirety.

BACKGROUND OF THE DISCLOSURE

The present disclosure generally relates to systems and methods for forming and/or finalizing containers, trays, and/or other suitable constructs.

SUMMARY OF THE DISCLOSURE

According to one aspect, the disclosure is generally directed to a tray engaging assembly, the tray engaging assembly comprising a first vertical support, a second vertical support, a first guide rail coupled to the first vertical support, a second guide rail coupled to the second vertical support and spaced apart from the first guide rail and such that a pocket is defined between the first guide rail and the second guide rail for at least partially receiving at least one tray, and a plurality of tray engaging members pivotably coupled to a respective guide rail for engaging at least one tray.

According to another aspect, the disclosure is generally directed to a method, the method comprising obtaining a first vertical support, obtaining a second vertical support, coupling a first guide rail to the first vertical support, coupling a second guide rail to the second vertical support such that the first guide rail is spaced apart from the second guide rail and such that a pocket is defined between the first guide rail and the second guide rail for at least partially receiving at least one tray, and pivotably coupling a plurality of tray engaging members pivotably to a respective guide rail for engaging at least one tray.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to a system and method of preparing/processing/forming and/or finishing trays, packages, cartons, containers, or other constructs for holding products such as food products, e.g., fruit or vegetable items. In one embodiment, articles described herein can be fruits such as tomatoes (e.g., cherry tomatoes, etc.), berries (e.g., blueberries, raspberries, blackberries, strawberries, etc.), apples, oranges, tangerines, clementines, lemons, limes, cherries, etc. In another embodiment, articles described herein can be product packages, containers, bottles, cans, etc., that are at least partially disposed within the tray embodiments. The articles can be used for packaging food and beverage products, for example.

Figure 1:
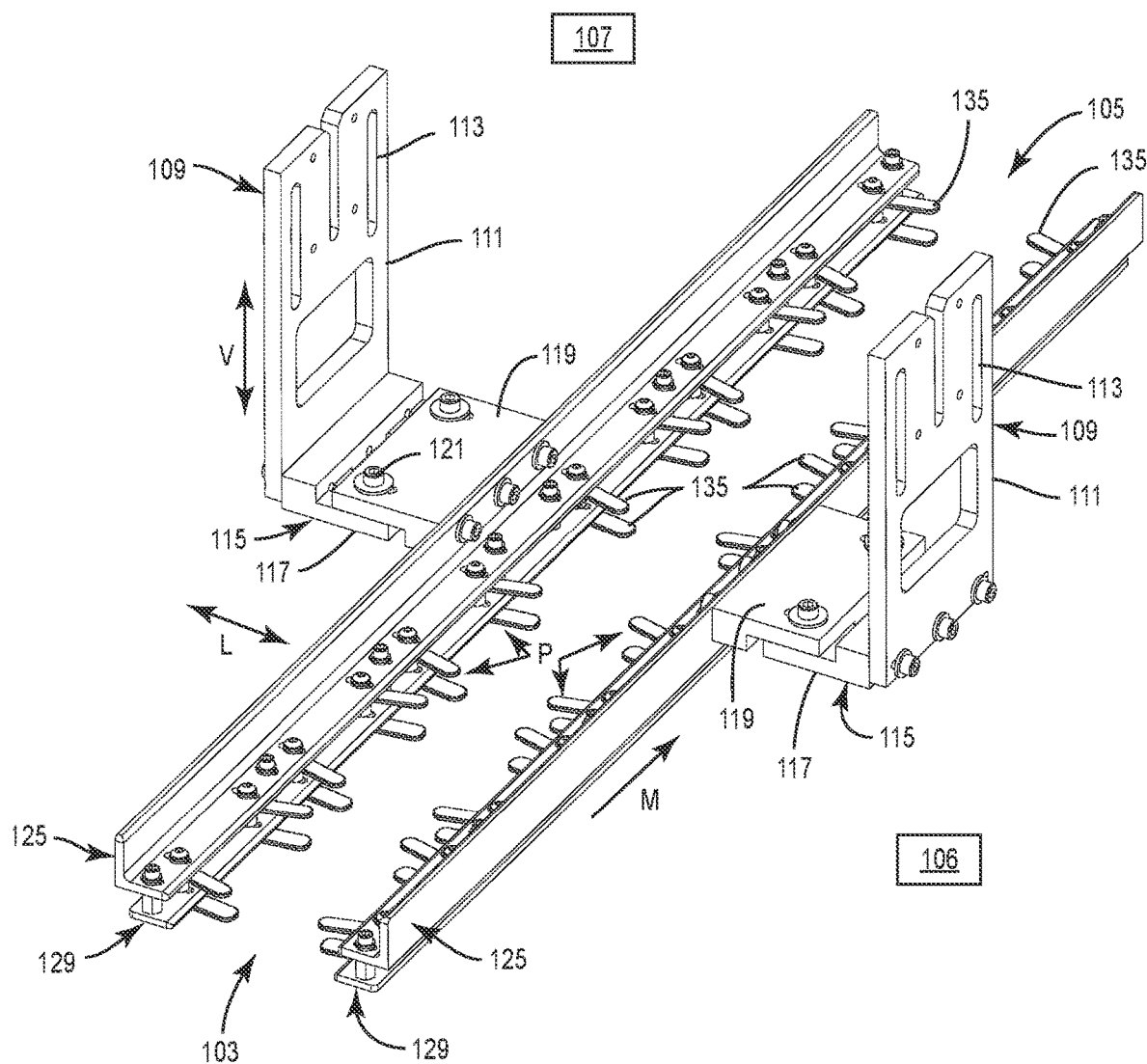
FIG. 1 is a perspective view of a tray engagement assembly according to an exemplary embodiment of the disclosure.
Figure 2:
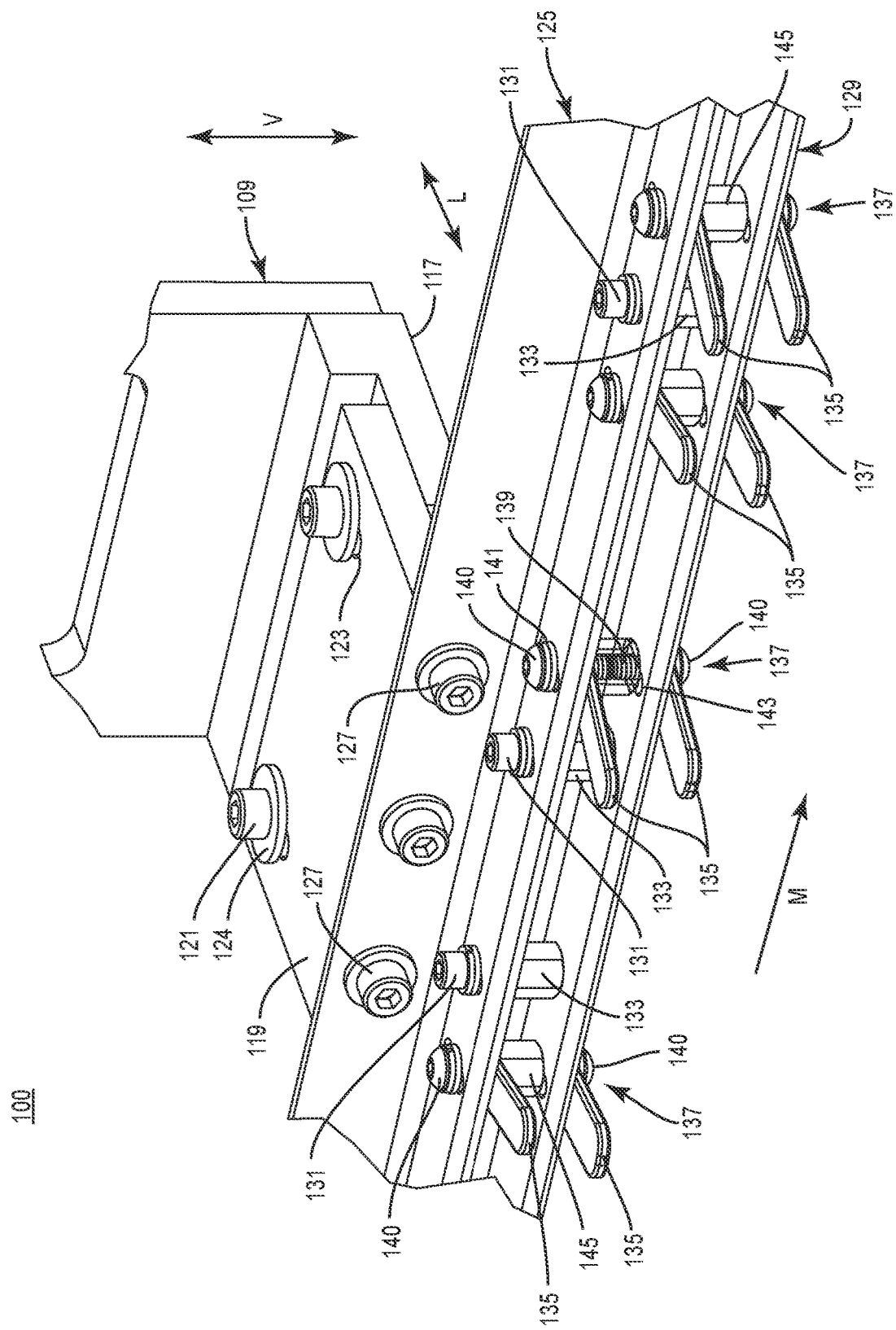
FIG. 2 is an enlarged perspective view of a portion of the tray engagement assembly of FIG. 1.
Figure 3:
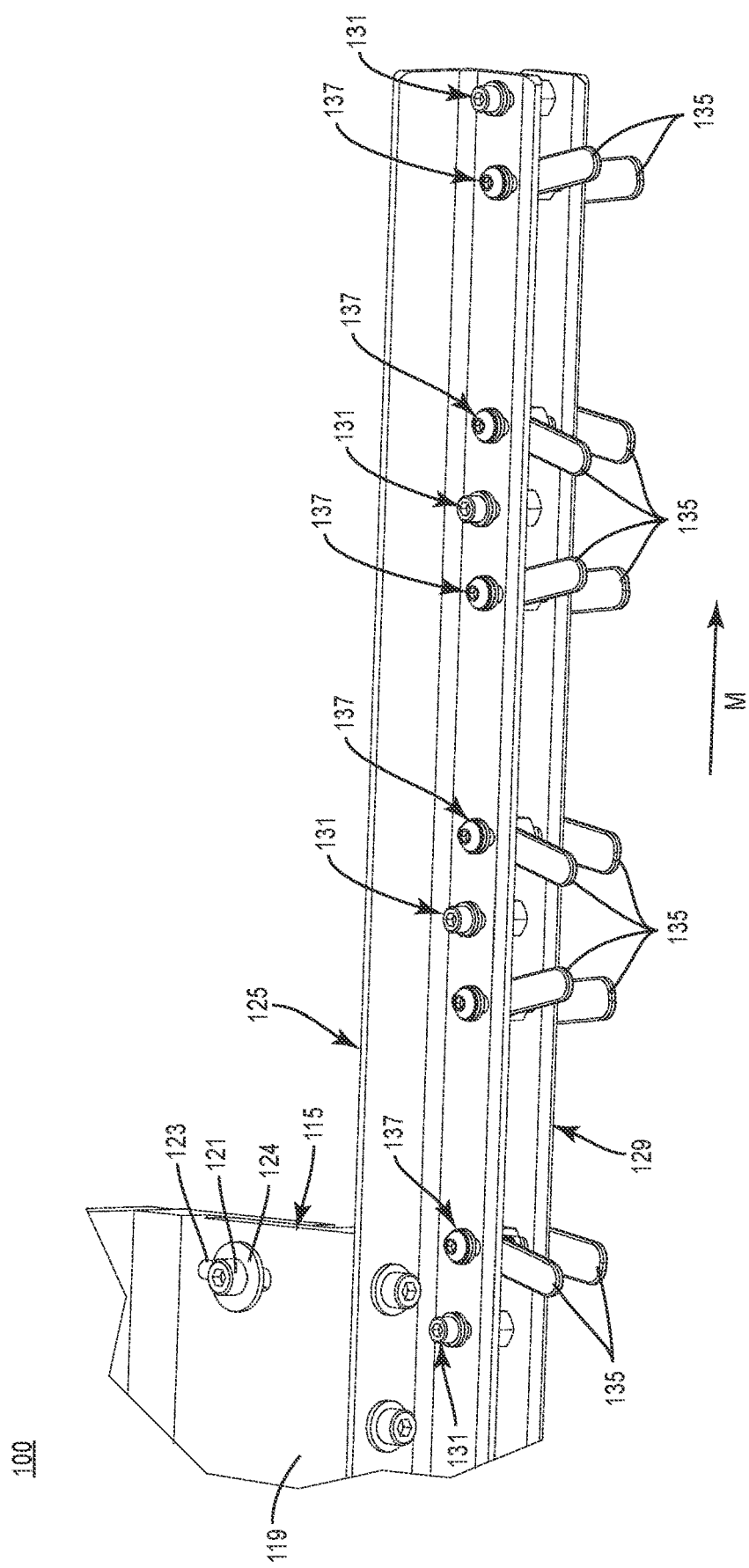
FIG. 3 is an enlarged perspective view of another portion of the tray engagement assembly of FIG. 1.
Figure 4:
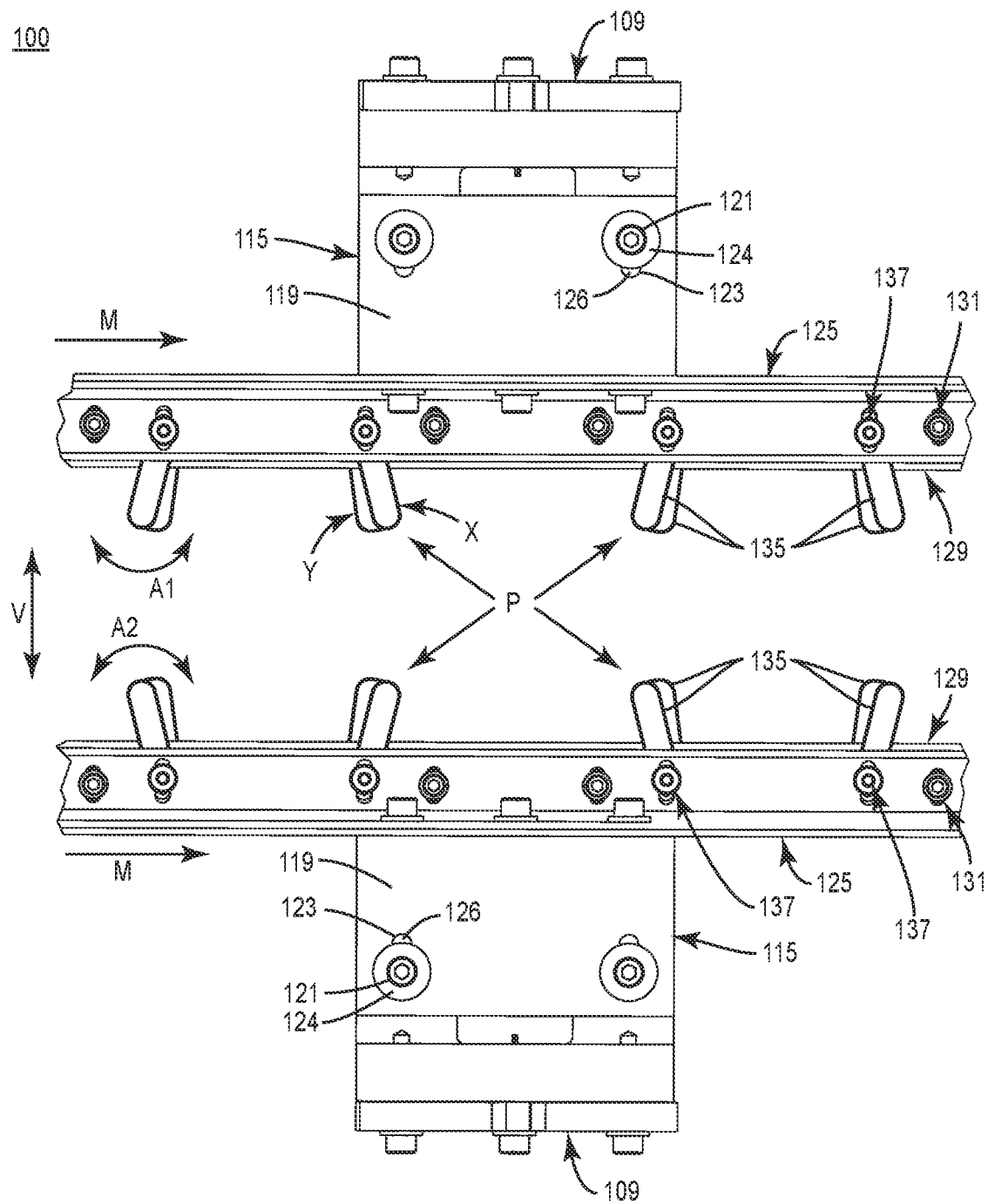
FIG. 4 is an enlarged top plan view of a portion of the tray engagement assembly of FIG. 1.

FIG. 1. is a perspective view of an exemplary embodiment of an assembly 100 for engaging trays 20 according to an exemplary embodiment of the disclosure. FIGS. 2-4 are further views of portions of the tray engaging assembly 100, and FIG. 5 is a perspective view of the tray engaging assembly 100 engaging a plurality of trays 20.

Figure 5:
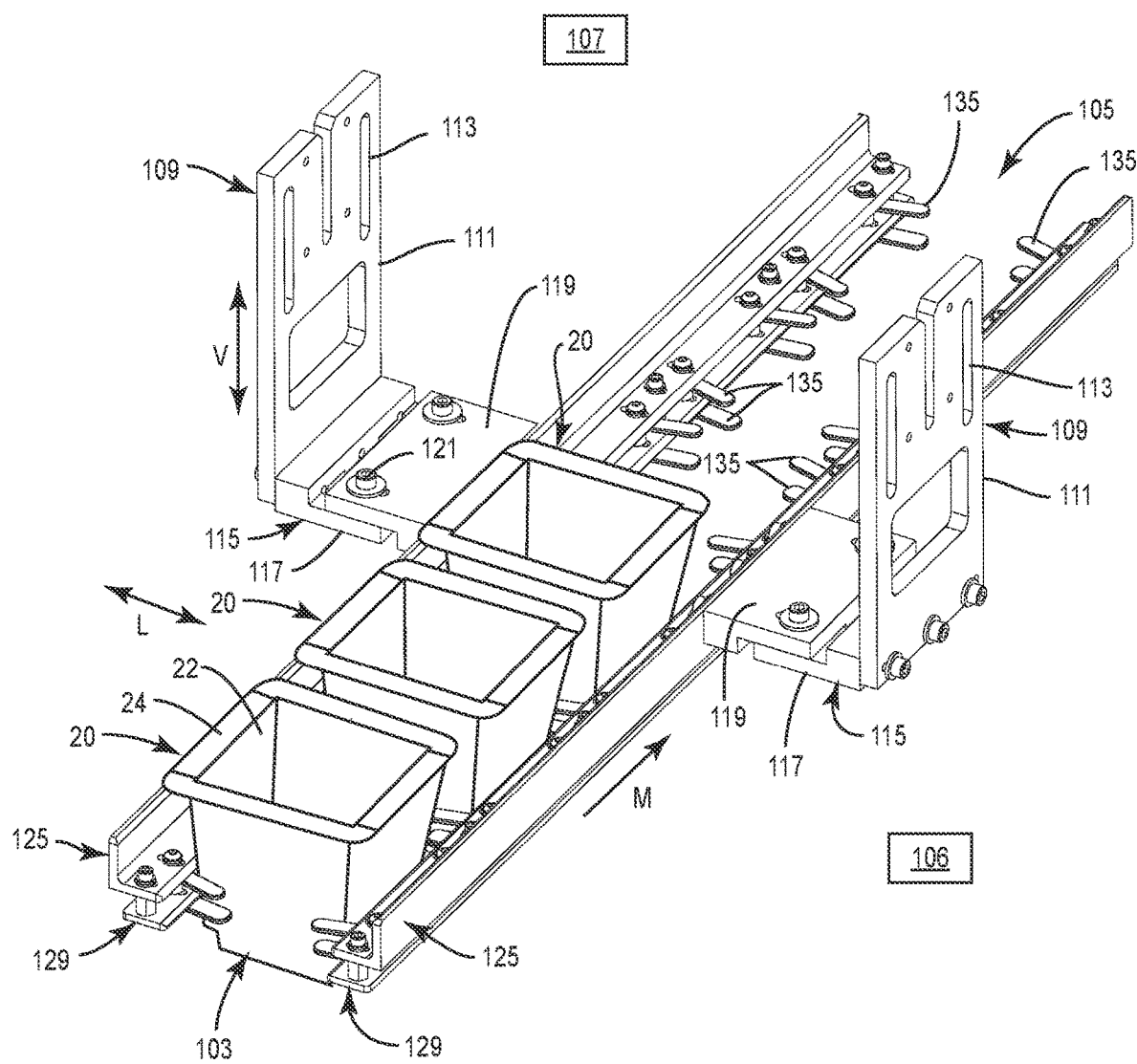
FIG. 5 is a perspective view of the tray engagement assembly of FIG. 1 engaging a plurality of trays.

As shown in FIG. 5, the trays 20 can have a plurality of panels extending at least partially around an interior 22 thereof, and having a rim 24 extending outwardly therefrom. The trays 20 can have a generally downwardly tapering configuration, as shown, though one or more of the trays 20 can have a different configuration without departing from the disclosure. Trays of a type suitable for use with the assembly 100 are described in U.S. Provisional Patent Application No. 63/110,578, filed on Nov. 6, 2020, U.S. Provisional Patent Application No. 63/110,582, filed on Nov. 6, 2020, U.S. Provisional Patent Application No. 63/110,587, filed on Nov. 6, 2020, U.S. Provisional Patent Application No. 63/126,157, filed on Dec. 16, 2020, U.S. Provisional Patent Application No. 63/128,418, filed on Dec. 21, 2020, U.S. Provisional Patent Application No. 63/139,341, filed on Jan. 20, 2021, U.S. Provisional Patent Application No. 63/169,302, filed on Apr. 1, 2021, U.S. Provisional Patent Application No. 63/169,418, filed on Apr. 1, 2021, U.S. Provisional Patent Application No. 63/174,724, filed on Apr. 14, 2021, U.S. Provisional Patent Application No. 63/178,116, filed on Apr. 22, 2021, U.S. Provisional Patent Application No. 63/191,412, filed on May 21, 2021, U.S. patent application Ser. No. 17/519,080, filed on Nov. 4, 2021, U.S. patent application Ser. No. 17/519,084, filed on Nov. 4, 2021, U.S. patent application Ser. No. 17/519,092, filed on Nov. 4, 2021, U.S. patent application Ser. No. 17/519,097, filed on Nov. 4, 2021, U.S. patent application Ser. No. 17/519,107, and filed on Nov. 4, 2021, the disclosures of each of which are incorporated by reference herein in their entirety. It will be understood that trays engaged with the assembly 100 can have a different configuration without departing from the disclosure.

As described herein, the tray engaging assembly 100 can form a system in its own regard, e.g., such that a process with regard to the trays 20 can begin with approaching/entering the assembly 100 and end with at least partially along/exiting the assembly 100. It will be understood that one or more processes can occur therebetween. The tray engaging assembly 100 can also be a subsystem or a part of a larger system, e.g., a system for forming the trays such as those disclosed in U.S. Provisional Patent Application No. 63/284,823, filed on Dec. 1, 2021, and U.S. patent application Ser. No. 18/071,985, filed on Nov. 30, 2022, the entire disclosures of each of which are hereby incorporated by reference for all purposes as if presented herein in its entirety.

As shown in FIG. 147. 1, the assembly 100 can be configured with an upstream end 103 and a downstream end 105, with a machine direction M generally defined from the upstream end 103 to the downstream end 105. The assembly 100 can also be configured to move the trays in a vertical direction indicated by the bidirectional arrow V that is generally perpendicular to the machine direction M, as described further herein.

It will be understood that the components of the assembly 100 described herein can be supported on one or more frames, e.g., platforms, legs, struts, bars, platforms, casters, connecting portions thereof, etc. As described above, the assembly 100 can be coupled/mounted/supported on or otherwise be arranged in cooperation with a larger system for forming the trays 20. In this regard, the assembly 100 can be coupled/mounted/supported/positioned proximate a downstream end of such system.

The assembly 100 can be arranged relative to one or more tray conveying apparatuses, e.g., having one or more of rotatably driven belts, chains, etc. for supporting and carrying one or more trays 20 thereupon. In some embodiments, one or more flights, lugs, or otherwise generally upstanding tray engaging members can be coupled to such belts, chains, etc. for engaging a portion of the respective trays 20. In the illustrated embodiment, a tray conveying apparatus 106 is schematically illustrated positioned below the tray engaging assembly 100. In this regard, the tray conveying apparatus 106 can support and move one or more trays thereupon such that the trays 20 move at least partially along the tray engaging assembly 100 in the machine direction M.

As also shown, the assembly 100 can be positioned below a lidding apparatus, schematically designated 107. The lidding apparatus 107 can be configured to apply a lidding film or other covering structure to the rim 24 of one or more of the trays 20 so as to cover the interior 24 thereof. Such lidding film can be a polymeric member, e.g., a film such as polyethylene terephthalate (PET) or other plastic. In one embodiment, the lidding film can be adhered to the rims 24 of the trays 20. In another embodiment, the lidding film can be heat sealed or otherwise coupled to the rims 24 of the trays 20. The lidding apparatus 107 also can be configured to appropriately size (e.g., via cutting, trimming, nipping, etc.) the lidding film prior to and/or following application thereof to the respective trays 20.

With continued reference to FIG. 1, the assembly 100 can include a pair of vertical supports 109 (broadly, "first vertical support" and "second vertical support"), each vertical support having a body 111 defining a plurality of elongate slots 113 through which vertical supports 109 can be coupled to a portion of the lidding apparatus 107 or a mounting structure proximate the lidding apparatus 107, e.g., via one or more fasteners or other mechanical connections. In one embodiment, the vertical supports 109 can be mechanically coupled to an actuator, e.g., a manual or electric actuator such as a wheel, crank, jack, etc., pneumatic or hydraulic driven piston, etc.

In this regard, one or more portions of the tray engaging assembly 100 can be selectively moved toward or away from the lidding apparatus 107 in the vertical direction V via driving or otherwise causing coupling members extending through the elongate slots 113 to move in a desired direction. It will be understood that the vertical supports 109 can cooperate with other structures for moving the assembly 100 along the vertical direction V in a different configuration without departing from the disclosure.

With additional reference to FIGS. 2-4, a lower portion of each vertical support 109 can be coupled to a respective mounting apparatus 115. Each mounting apparatus 115 can include a base portion or first portion 117 coupled to the body 111 of the respective vertical supports 109 and a respective distal portion or second portion 119 movably coupled to the respective first portion 117 via one or more respective fasteners 121. While the first portion 117 and the second portion 119 of the respective mounting apparatuses 115 are each shown having a generally stepped configuration such that the respective first portions 117 and the respective second portions 119 are arranged in an at least partially nested arrangement, it will be understood that one or more portions of one or both of the mounting apparatuses 115 can have a different configuration without departing from the disclosure.

In one embodiment, one or both of the second portions 119 can include a respective slot 123 extending therethrough for alignment with a respective aperture or slot 126 (FIG. 4) extending through the respective first portion 117.

In this regard, the respective second portion 119 can be selectively positioned at a location toward or away from the respective vertical support 109 in a lateral direction that is generally perpendicular to the machine direction M and indicated by the bidirectional arrow L. Such lateral movement can be accomplished via coupling of the respective portions 117, 119 through selected locations of the respective slots with the respective fasteners 121. The positions of the respective fasteners 121 can be maintained, for example, with one or more washers 124, nuts, etc.

A pair of parallel and spaced apart upper guide rails 125 (broadly, "first guide rail" and "second guide rail" or "first upper guide rail" and "second upper guide rail") can be coupled to the respective second portions 119 of the respective mounting apparatuses 115 at respective fasteners 127. In this regard, the spacing between the upper guide rails 125 can be changed via movement of one or both of the second portions 119 of the respective mounting apparatuses 115 described above.

Lower guide rails 129 (broadly, "first guide rail" and "second guide rail" or "first lower guide rail" and "second lower guide rail") can be positioned in generally parallel and spaced apart relation below the respective upper guide rails 125, and can be coupled thereto with respective fasteners 131. The positioning of the fasteners 131 can be maintained, for example, via washers, nuts, clips, clamps, etc. In the illustrated embodiment, spacing members 133 can be disposed about a portion of the respective fasteners 131 extending between the upper guide rails 125 and the lower guide rails 129. The spacing members 133 can thus be selectively sized, e.g., in the vertical direction V and/or selectively positioned along the respective fasteners 131 so as to provide a desired vertical spacing between the respective guide rails 125, 129. As shown, a pocket P or operating space can be defined (in the lateral direction L) between each guide rail 125 and each guide rail 129, and the space extending in the vertical direction therebetween, in which components of the tray engaging assembly 100 can move, and in which at least one tray 20 can be received, as described further herein.

While the tray engaging apparatus 100 is illustrated having respective pairs of coupled guide rails 125, 129, it will be understood that a pair of spaced guide rails 125 can be provided without the accompanying respective lower guide rails 129 without departing from the disclosure.

With continued reference to FIGS. 1-5, the tray engaging apparatus 100 can be provided with a plurality of tray engagement members 135 movably/pivotably coupled to the respective guide rails 125, 129 and extending into the pocket P.

A shown, the respective tray engagement members 135 can be generally elongate projections having a finger-like configuration. As described further herein, the tray engagement members 135 are configured to contact/engage respective portions of the trays 20 for maintaining the trays 20 in a desired position. In this regard, the tray engagement members 135 can be formed of a material suitable for engagement with paperboard trays, e.g., a polymeric, metallic, and/or composite material. One or more of the tray engaging members 135 can be further provided with one or more enhanced tray engaging configurations or surface features, e.g., curves, notches, hooks, curls, knurls, ridges, etc. In some embodiments, the tray engaging members 135 can be provided with a coating or sleeve for enhancing engagement with the respective trays, e.g., a rubber or other polymeric coating or sleeve.

In the illustrated arrangement, a series of tray engaging members 135 can be provided in spaced apart relation along the machine direction M and coupled to a lower portion of the respective upper guide rails 125.

Similarly, a series of tray engaging members 135 can be provided in spaced apart relation along the machine direction M and coupled to a lower portion of the respective lower guide rails 129. While the tray engaging members 135 associated with the upper guide rails 125 and the tray engaging members 135 associated with the lower guide rails 129 can be generally aligned and in mechanical cooperation, it will be understood that one or more of the tray engaging members 135 can be independently coupled and operated to a respective guide rail, as described further herein. It will be further understood that the tray engaging members 135 can be provided in a different number and/or arrangement without departing from the disclosure.

As shown, respective pairs of upper and lower tray engaging members 135 can be coupled to each other via a coupling 137 extending therethrough. The couplings 137 can have a generally elongate threaded body 139 extending from the upper guide rail 125 to the lower guide rail 129, the body 139 of the couplings 137 intersecting a respective upper flanged head 140 and lower flanged head 140.

The couplings 137 can extend through a respective slot 141 defined in the upper guide rail 125 and a respective slot 143 defined in the lower guide rail 129 such that the couplings 137 can be moved toward or away the pocket P via selective positioning through the respective slots 141, 143, e.g., in the lateral direction L.

The couplings 137 can also be configured for coupling with a respective spacing member 145 positioned between a respective upper tray engaging member 135 and lower guide rail 129. In the illustrated embodiment regard, the body 139 of the respective couplings 137 can be at least partially received through the respective spacing members 145. In some embodiments, the interior surface of the spacing members 145 can have a threaded surface for threaded engagement with the threaded body 139 of the couplings 137. In some embodiments, the couplings 137 and spacing members 145 can be devoid of threaded features.

In the illustrated arrangement, the respective upper tray engaging members 135 can be positioned between the respective upper guide rail 125 and the respective spacing member 145, and the respective lower tray engaging members 135 can be positioned between the respective lower flanged head 140 of the respective couplings 137 and the respective lower guide rail 129. It will be understood that the tray engaging members 135 can be coupled to the respective guide rails 125, 129 in a different arrangement without departing from the disclosure.

Accordingly, the spacing members 145 can be selectively sized, in the vertical direction V so as to provide a desired vertical spacing between the respective upper tray engaging members 135 and lower engaging members 135. In some embodiments, the spacing members 145 can be sized proportional to the spacing members 133 provided between the upper and lower guide rails 125, 129. In some embodiments, the spacing members 145 can facilitate threaded or other selective relative adjustment of the respective upper guide rail 125 and lower guide rail 129 along the vertical direction V.

The tray engaging members 135, couplings 137, and spacing members 145 can be arranged in respective vertical pairs so as to rotate together through at least a portion of the pocket P between the pair of guide rails 125, 129 and the pair of guide rails 125, 129. In this regard, the couplings 137 can include an adapter recess 147 at one or both of the flanged heads 140 of the respective couplings 137 for receiving a rotational driving member or actuator, e.g., so as to rotate the respective pair of tray engaging members 135 a desired path in the direction of the bidirectional arrows A1, A2 through the pocket P. In some embodiments, the spacing members 145 can be provided to exert a desired resistance to rotation through the path indicated by a respective arrow A1, A2, for example, in situations in which the positioning of the respective tray engaging members 135 are desired to be maintained at a relatively static position.

In the illustrated embodiment, the respective upper tray engaging members 135 can be independently adjustable along a respective bidirectional arrow A1, A2 relative to a respective lower tray engaging member 135 along a respective bidirectional arrow A1, A2. In this regard, a respective upper tray engaging member 135 pivotably coupled to a respective upper guide rail 125 by a respective coupling 137 can be positioned at a first rotational position in the pocket P, e.g., a first rotational position X as illustrated in FIG. 4, and a respective lower tray engaging member 135 pivotably coupled to a respective lower guide rail 129 by a respective coupling 137 can be positioned at a second rotational position in the pocket P, e.g., a second rotational position Y as illustrated in FIG. 4, the first rotational position X different from the second rotational position Y.

With continued reference to FIGS. 1-5, and with additional reference to FIG. 6, one or more operations of the tray engaging assembly 100 will be described according to an exemplary embodiment of the disclosure.

In the illustrated embodiment, one or more trays 20 can be supported on the conveyor apparatus 106, and the conveyor apparatus 106 can be driven to advance the trays 20 in the machine direction M at least partially into the pocket P between the guide rails 125, 129. It will be understood that the trays 20 can otherwise be positioned at least partially in the pocket P of the assembly 100.

In the aforementioned arrangement, the trays 20 can be positioned with the upper portions thereof extending upwardly from the upper guide rails 125. Upon positioning the trays 20 in a desired position along the pocket P, one or more actuators/rotational driving members can engage respective adapter recesses 147 of the respective couplings 137. In this regard, a tool head or other driving member can be at least partially inserted into the respective adapter recess 147 and rotated, e.g., along a respective bidirectional arrow A1, A2, to cause the respective couplings 137 to rotate such that the respective tray engaging members 135 coupled thereto rotate through the pocket P.

In the illustrated embodiment, tray engaging members 135 positioned at a trailing end of a tray 20 can be driven to rotate into contact with the trailing portion of the tray 20 and tray engaging members 135 positioned proximate a leading portion of a tray 20 can be driven to rotate into contact with the leading portion of the tray 20. In this regard, the successive couplings 137 along the machine direction M can be driven to rotate in alternative rotational directions, e.g., along the respective arrows A1, A2, to cause the aforementioned directional movement of the tray engaging members 135 to engage leading and trailing portions of a respective tray 20. In some embodiments, respective tray engaging members 135 coupled to the respective guide rails 125, 129 can be positioned in the pocket P in generally oblique relation to the machine direction M to engage a respective tray 20, e.g., such that each tray 20 is at least partially engaged by a tray engaging member 135 coupled to the first upper guide rail 125, a tray engaging member 135 coupled to the second upper guide rail 125, a tray engaging member 135 coupled to the first lower guide rail 129, and a tray engaging member 135 coupled to the second lower guide rail 129.

In some embodiments, an upper tray engaging member 135 and a lower tray engaging member 135 coupled to a respective coupling 137 can be positioned in the pocket P at desired rotational positions without common rotation of the respective coupling 137, e.g., such that the respective upper tray engaging member 135 can be rotationally positioned relative to the respective coupling 137 and the respective lower tray engaging member 135 can be independently rotationally positioned relative to the respective coupling 137.

Prior to, during, and/or following such engagement of the tray engaging members 135 with the trays 20, one or more portions of the tray engaging assembly 100 can be reconfigured so as to facilitate engagement with a respective tray 20 or portion thereof. For example, a position of one or more tray engaging member 135 can be adjusted based on a desire to more tightly or less tightly engage a respective tray 20, or to engage a tray 20 having different dimensions.

In one example, and as described above, a respective pair of guide rails 125, 129 can be moved toward or away from the trays 20 in the lateral direction L, for example, to widen or narrow the pocket P, via moving a respective second portion 119 of a respective mounting apparatus 115 relative to a respective first portion 117. In one example, such reconfiguration of a mounting apparatus 115 can be effected by loosening a respective fastener 121 and moving the second portion 119 in a desired direction, e.g., such that the fastener 121 is positioned in a different location in a respective slot 123.

In another example, and as described above, spacing members 133 between the respective guide rails 125, 129 can be replaced/adjusted/moved to change the distance between the guide rails 125, 129, in the vertical direction V for example, to position respective tray engaging members 135 for engagement with a different portion of the tray 20, to provide for alternative/additional/fewer tray engaging members 135, etc.

As yet another example, the positioning of the couplings 137 and the tray engaging members 135 connected thereto can be adjusted relative to the guide rails 125, 129 by moving a respective coupling 137 through the respective slots 141, 143 in the lateral direction L toward or away from the pocket P.

Furthermore, the points along the tray 20 that are contacted by the respective tray engaging members 135 can be changed via movement of the vertical supports 109 relative to an actuating structure in the vertical direction V.

Accordingly, the assembly 100 provides multiple modalities of reconfiguration for moving one or more of the tray engaging members 135 in a desired linear direction (e.g., the machine direction M, the vertical direction V, or the lateral direction L that is generally perpendicular to both the machine direction M and vertical direction V) relative to the pocket P.

In this regard, one or more portions of the tray engaging assembly 100 can be reconfigured to accommodate larger/smaller/differently-configured trays 20. In one embodiment, the tray engaging assembly 100 can be iteratively reconfigured to determine a suitable configuration for use with a particular tray or series of tray. Upon such determination of a desired configuration of the tray engaging assembly 100, for example, the tray engaging assembly can be used to fabricate additional units thereof. Such additional units may be provided without one or more of the reconfigurable features discussed above, such that the tray engaging assembly 100 may be used as a testing or measurement device from which permanent assemblies can be reproduced. Accordingly, the tray engaging assembly 100 may be provided as a modular component for cooperation with another assembly/system/subsystem, etc., and which can be installed and removed as desired.

Upon engagement of the trays 20 with the tray engaging members 135 as described above, the tray engaging apparatus 100 can be raised toward the lidding apparatus 107 along the vertical direction V for application of a lidding film as described above.

Such approximation of the tray engaging apparatus 100 toward the lidding apparatus 107 can be effected, for example, via movement of the vertical supports 109 in cooperation with an actuator.

It will be understood that one or more components of the assembly 100 can have a different configuration, position, arrangement, etc., without departing from the disclosure.

It will also be understood that one or more of the components of the systems described herein can have a different configuration without departing from the disclosure. It will be further understood that suitable supporting structures (e.g., bases, legs, platforms, supports, braces, etc.) can be provided to support and facilitate operation of the various components described herein.

In general, the blanks of the present disclosure may be constructed from paperboard having a caliper so that it is heavier and more rigid than ordinary paper. The blank can also be constructed of other materials, such as cardboard, or any other material having properties suitable for enabling the construct to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A tray engaging assembly, the tray engaging assembly comprising:
   a first vertical support;
   a second vertical support;
   a first upper guide rail coupled to the first vertical support and a first lower guide rail coupled to the first upper guide rail;
   a second guide rail coupled to the second vertical support and spaced apart from the first upper guide rail and such that a pocket is defined between the first upper guide rail and the second guide rail for at least partially receiving at least one tray; and
   a plurality of tray engaging members pivotably coupled to a respective guide rail for engaging at least one tray.

2. The tray engaging assembly of claim 1, wherein the plurality of tray engaging members extend into the pocket.

3. The tray engaging assembly of claim 2, wherein the tray engaging assembly defines an upstream end, a downstream end, and a machine direction extending from the upstream end to the downstream end, the plurality of tray engaging members are adjustable relative to the respective first upper guide rail and second guide rail in a lateral direction, the lateral direction generally perpendicular to the machine direction.

4. The tray engaging assembly of claim 3, wherein at least one tray engaging member of the plurality of tray engaging members is pivotably coupled to the first upper guide rail and at least one tray engaging member of the plurality of tray engaging members is pivotably coupled to the first lower guide rail.

5. The tray engaging assembly of claim 4, wherein the first lower guide rail is selectively adjustable relative to the first upper guide rail along a vertical direction, the vertical direction generally perpendicular to each of the machine direction and the lateral direction.

6. The tray engaging assembly of claim 4, wherein a coupling extends at least partially through each of the first upper guide rail, the at least one tray engaging member pivotably coupled to the first upper guide rail, the first lower guide rail, and the at least one tray engaging member pivotably coupled to the first lower guide rail.

7. The tray engaging assembly of claim 6, wherein the at least one tray engaging member of the plurality of tray engaging members pivotably coupled to the first upper guide rail is positionable at a first rotational position in the pocket, the at least one tray engaging member of the plurality of tray engaging members pivotably coupled to the first lower guide rail is positionable at a second rotational position in the pocket, and the first rotational position is different than the second rotational position.

8. The tray engaging assembly of claim 6, wherein the second guide rail is a second upper guide rail and the tray engaging assembly further comprises a second lower guide rail coupled to the second upper guide rail, at least one tray engaging member of the plurality of tray engaging members pivotably coupled to the second upper guide rail and at least one tray engaging member of the plurality of tray engaging members pivotably coupled to the second lower guide rail.

9. The tray engaging assembly of claim 8, wherein the at least one tray engaging member pivotably coupled to the first upper guide rail, the at least one tray engaging member pivotably coupled to the first lower guide rail, the at least one tray engaging member pivotably coupled to the second upper guide rail, and the at least one tray engaging member pivotably coupled to the second lower guide rail are each positioned for at least partial engagement with the at least one tray for being at least partially received in the pocket.

10. The tray engaging assembly of claim 9, wherein the at least one tray engaging member pivotably coupled to the first upper guide rail, the at least one tray engaging member pivotably coupled to the first lower guide rail, the at least one tray engaging member pivotably coupled to the second upper guide rail, and the at least one tray engaging member pivotably coupled to the second lower guide rail are each positioned in the pocket generally obliquely relative to the machine direction.

11. The tray engaging assembly of claim 3, wherein a first mounting apparatus is coupled to the first vertical support and a second mounting apparatus is coupled to the second vertical support, the first mounting apparatus comprises a first portion coupled to the first vertical support and a second portion coupled to each of the first portion of the first mounting apparatus and the first upper guide rail, the second mounting apparatus comprises a first portion coupled to the second vertical support and a second portion coupled to each of the first portion of the second mounting apparatus and the second guide rail.

12. The tray engaging assembly of claim 11, wherein the second portion of the first mounting apparatus is movably coupled to the first portion of the first mounting apparatus along the lateral direction, and the second portion of the second mounting apparatus is movably coupled to the first portion of the second mounting apparatus along the lateral direction.

13. A method, the method comprising:
obtaining a first vertical support;
obtaining a second vertical support;
coupling a first upper guide rail to the first vertical support;
coupling a first lower guide rail to the first upper guide rail;
coupling a second guide rail to the second vertical support such that the first upper guide rail is spaced apart from the second guide rail and such that a pocket is defined between the first upper guide rail and the second guide rail for at least partially receiving at least one tray; and
pivotably coupling a plurality of tray engaging members pivotably to a respective guide rail for engaging at least one tray.

14. The method of claim 13, wherein the plurality of tray engaging members extend into the pocket.

15. The method of claim 14, wherein first upper guide rail and the second guide rail are arranged to define an upstream end, a downstream end, and a machine direction extending from the upstream end to the downstream end, the plurality of tray engaging members are pivotably coupled to the respective first upper guide rail and second guide rail so as to be adjustable in a lateral direction, the lateral direction generally perpendicular to the machine direction.

16. The method of claim 15, further comprising moving at least one tray engaging member of the plurality of tray engaging members in a lateral direction relative to the respective first upper guide rail and second guide rail.

17. The method of claim 15, wherein pivotably coupling the plurality of tray engaging members to a respective guide rail comprises pivotably coupling at least one tray engaging member of the plurality of tray engaging members to the first upper guide rail, and pivotably coupling the plurality of tray engaging members to a respective guide rail comprises pivotably coupling at least one tray engaging member of the plurality of tray engaging members to the first lower guide rail.

18. The method of claim 17, wherein coupling the first lower guide rail to the first upper guide rail comprises coupling the first lower guide rail being selectively adjustable relative to the first upper guide rail along a vertical direction, the vertical direction generally perpendicular to each of the machine direction and the lateral direction.

19. The method of claim 18, wherein the method further comprises adjusting the first lower guide rail relative to the first upper guide rail along the vertical direction.

20. The method of claim 17, wherein coupling the plurality of tray engaging members to a respective guide rail comprises positioning a coupling extending at least partially through each of the first upper guide rail, the at least one tray engaging member pivotably coupled to the first upper guide rail, the first lower guide rail, and the at least one tray engaging member pivotably coupled to the first lower guide rail.

21. The method of claim 20, wherein coupling the plurality of tray engaging members to a respective guide rail comprises coupling the at least one tray engaging member of the plurality of tray engaging members pivotably coupled to the first upper guide rail at a first rotational position in the pocket, and coupling the plurality of tray engaging members to a respective guide rail comprises coupling the at least one tray engaging member of the plurality of tray engaging members pivotably coupled to the first lower guide rail at a second rotational position in the pocket, the first rotational position is different than the second rotational position.

22. The method of claim 20, wherein the second guide rail is a second upper guide rail, the method further comprises coupling a second lower guide rail to the second upper guide rail, coupling the plurality of tray engaging members to a respective guide rail comprises pivotably coupling at least one tray engaging member of the plurality of tray engaging members to the second upper guide rail, and coupling the plurality of tray engaging members to a respective guide rail comprises pivotably coupling at least one tray engaging member of the plurality of tray engaging members to the second lower guide rail.

23. The method of claim 22, wherein the at least one tray engaging member pivotably coupled to the first upper guide rail, the at least one tray engaging member pivotably coupled to the first lower guide rail, the at least one tray engaging member pivotably coupled to the second upper guide rail, and the at least one tray engaging member pivotably coupled to the second lower guide rail are each positioned for at least partial engagement with at least one tray for being at least partially received in the pocket.

24. The method of claim 23, wherein the at least one tray engaging member pivotably coupled to the first upper guide rail, the at least one tray engaging member pivotably coupled to the first lower guide rail, the at least one tray engaging member pivotably coupled to the second upper guide rail, and the at least one tray engaging member pivotably coupled to the second lower guide rail are each positioned in the pocket generally obliquely relative to the machine direction.

25. The method of claim 15, further comprising coupling a first mounting apparatus to the first vertical support, and coupling a second mounting apparatus to the second vertical support, the first mounting apparatus comprises a first portion coupled to the first vertical support and a second portion coupled to each of the first portion of the first mounting apparatus and the first upper guide rail, the second mounting apparatus comprises a first portion coupled to the second vertical support and a second portion coupled to each of the first portion of the second mounting apparatus and the second guide rail.

26. The method of claim 25, wherein the second portion of the first mounting apparatus is movably coupled to the first portion of the first mounting apparatus along the lateral direction, and the second portion of the second mounting apparatus is movably coupled to the first portion of the second mounting apparatus along the lateral direction.

27. The method of claim 26, further comprising moving at least one of the second portion of the first mounting apparatus relative to the first portion of the first mounting apparatus along the lateral direction and moving the second portion of the second mounting apparatus relative to the first portion of the second mounting apparatus along the lateral direction.

* * * * *